April 11, 1961     E. UNGER     2,979,670
APPARATUS FOR SCANNING POINTER POSITIONS
Filed Oct. 1, 1957     2 Sheets-Sheet 1

*INVENTOR*
Erich Unger
BY *Stevens, Davis, Miller & Mosher*
*ATTORNEYS*

April 11, 1961 E. UNGER 2,979,670
APPARATUS FOR SCANNING POINTER POSITIONS
Filed Oct. 1, 1957 2 Sheets-Sheet 2

INVENTOR
Erich Unger
BY *Steven, Davis Miller* (signature)
ATTORNEYS

United States Patent Office 2,979,670
Patented Apr. 11, 1961

2,979,670
APPARATUS FOR SCANNING POINTER POSITIONS

Erich Unger, Nurnberg, Germany, assignor to Metrawatt Aktiengesellschaft, Nurnberg, Germany Filed Oct. 1, 1957, Ser. No. 687,630
Claims priority, application Germany Oct. 4, 1956
1 Claim. (Cl. 331—64)

The invention concerns an apparatus for the inductive scanning of a pointer position.

Various methods and apparatus are known for allowing a direct current of low reactive effect to be constantly controlled by the low forces which are supplied by electro-mechanical measuring instruments. Thus, for example, photoelectric and bolometrically acting pointer scanning devices are known. Scanning devices have lately been in frequent use operating according to the induction method, in which the coupling of two induction coils is varied to a greater or lesser extent, e.g. by inserting a small metal tongue connected with the pointer into the common air gap between the coils.

The coils, the coupling of which is varied in this manner, may be connected in the grid circuit or the anode circuit of a tube oscillator, which produces a continuous alternating voltage. The condition is then exploited wherein the amplitude of the alternating voltage prevailing in the anode circuit of a self excited tube oscillator is dependent upon the coupling coefficient of the coils. Thus it is possible, by means of inserting a small metal tongue into the common air gap to vary the oscillator amplitude. The alternating voltage output of the oscillator is rectified and used, for example, for controlling a self acting compensating device. Thus it is desired to be able to vary the amplitude continuously over an as large a range as possible. Conventional tube oscillators, however, have the disadvantage that the range of variation of the alternating voltage output, in dependence upon the coupling, is only limited. When varying the coupling, the alternating voltage output is varied in most cases such that a reducing coupling causes a reduction in the oscillator voltage. If, however, the coupling is reduced below a certain limit, then the oscillator vibration breaks off completely. The exploitable range of the alternating voltage output, therefore, approximately corresponds to a ratio of 1:3.

This results from the dependence of the amplifying factor of ordinary three-pole tubes, which is constant for low alternating voltages and reduced for higher voltages. For varying couplings there is determined an amplifying factor V, in which the self exciting condition is fulfilled: $K.V = 1$.

For a gradually reducing coupling, therefore, the oscillator alternating voltage output is constantly varied until the range of constant amplification has been reached, whereupon the oscillator amplitude jumps to zero.

It is, therefore, the object of the invention to provide an apparatus for scanning a pointer position by inductive means, which supplies an output voltage variable constantly to zero. In hitherto known connections this could only be attained by introducing a counter-voltage or by a bridge method connection which involves considerable expenditure. The drawing shows by way of example an embodiment of the invention.

As already explained above, in the arrangement according to the invention a metal tongue is fitted on the pointer, the position of which is to be scanned, which tongue is inserted to a greater or lesser extent into the air gap formed between the coils in the grid circuit, or in the anode circuit respectively of a self excited tube oscillator. In accordance with the invention, however, the oscillator is so constructed that it does not produce any continuous oscillations, but intermittent oscillations. This is attained by means of a corresponding selection of the grid circuit-time constant. Thus it is possible by means of the arrangement in accordance with the invention to obtain a constant output voltage variable to zero.

Figure 1:
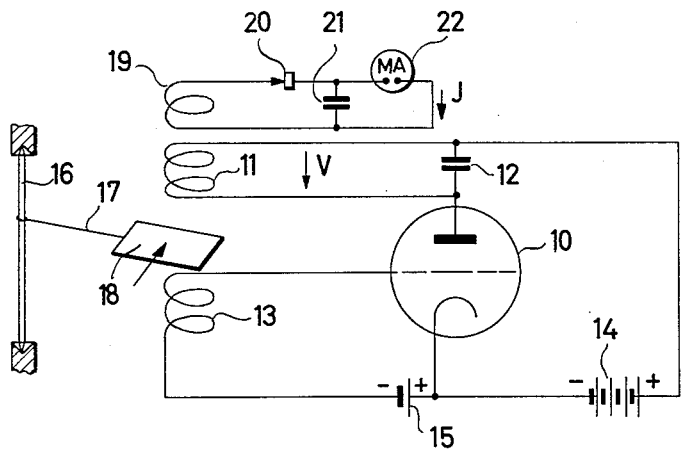
Fig. 1 shows a hitherto conventional arrangement for scanning a pointer.

Fig. 1 shows a connection diagram of a conventional self exciting tube oscillator, which produces continuous alternating voltages of a definite frequency. The tube oscillator consists of an electron tube 10, in whose anode circuit there is connected an oscillation circuit, which consists of a coil 11 and a condenser 12, connected in parallel. Between the control grid and the cathode of the tube 10 there is disposed a further coil 13, which is inductively connected with the coil 11. A source of current 14 supplies the necessary anode voltage. Since in the case of tube oscillators of this kind the occurrence of grid currents is generally not desired, there is furthermore provided a grid bias, which, e.g. is supplied by a source of current 15. This connection and the method of operation thereof is so generally known in the art that it need not be explained in detail herein.

Numeral 16 denotes the shaft of the electro-mechanical measuring mechanism supporting the pointer 17, the position of which is to be indicated by means of the oscillator. For this purpose the pointer 17 carries a metal tongue 18, which with one revolution of the shaft 16 is swung to a greater or lesser extent into the air gap formed between the coils 11 and 13. Thus the metal tongue 18 affects the magnetic alternating field formed between the two coils and by this means varies the coupling of the tube oscillator. Varying the coupling also varies the alternating voltage V produced in the anode circuit of the oscillator, namely, mostly in this respect that a reduced coupling results in a reduction of the voltage V.

In order to render possible the utilization of the amplitude of the voltage V, a further coil 19, in which a voltage is induced, which is proportional to the voltage V, is coupled with the coil 11. This voltage is rectified by way of the rectifier 20 and smoothed out by means of a condenser 21, thus obtaining a direct voltage which is proportional relative to the voltage V. It is possible to connect to the terminals of the condenser 21 a consumer 22, e.g. a measuring instrument, a compensating device or the like, which is then energized by a direct current 1. The direct current 1 is then in a direct connection with the position of he ponter 17 or the metal tongue 18 respectively.

Figure 3:
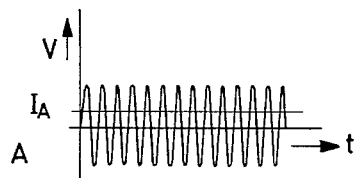
Figs. 3 and 4 show diagrams for explaining the mode of operation of the arrangement according to Fig. 1.
Figure 3:
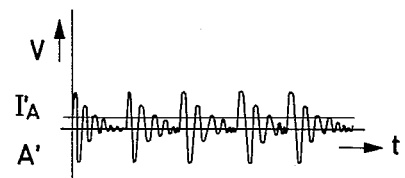
Figure 4:
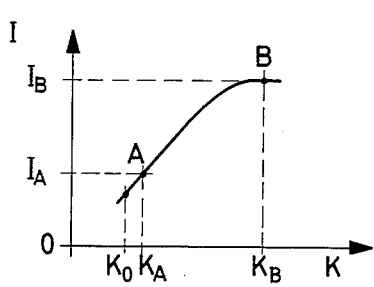

The mode of operation of the connection arrangement of Fig. 1 is best understood by way of the diagrams of Figs. 3 and 4. In Fig. 3A there is shown the time-path of the voltage V, which is produced with a definite coupling $K_A$ in the anode circuit of the oscillator. To this alternating voltage corresponds a direct current $I_A$ through the consumer 22, which is also shown in the diagram. With a different coupling $K_B$ there occurs an alternating voltage V, the time-path of which is shown in the diagram of Fig. 3B. This alternating voltage has a greater amplitude, and consequently the consumer 22 is energized by a direct current $I_B$ which is greater than the direct current $I_A$.

Fig. 4 shows the dependence of the current I through the consumer 22 upon the degree of coupling K. The working point A corresponds to the operational state of Fig. 3A, while the working point B corresponds to the operational state of Fig. 3B. It is to be seen that the current I varies in a definite range constantly in dependence upon the coupling K. There exists, however, a minimum coupling $K_0$, below which there can no longer occur an oscillation. If, therefore, the coupling K is reduced to below the minimum coefficient $K_0$, there is no longer a direct current in the consumer 22.

Figure 2:
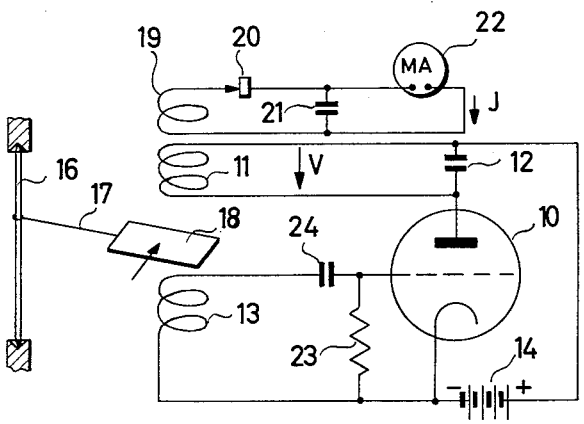
Fig. 2 shows an arrangement according to the invention.

Fig. 2 shows the arrangement modified in accordance with the invention. It substantially corresponds to the arrangement of Fig. 1, and, therefore, identical parts are provided with identical reference numerals. The connection of the oscillator of Fig. 2 differs, however, from the connection of the oscillator of Fig. 1, in that a resistance-condenser combination is arranged in the grid circuit of the tube 10. This combination consists of a resistance 23 which is connected with the control grid or the cathode respectively of the tube 10, and a condenser 24, which is disposed between the terminal resistance 23 connected with the grid of the tube 10 and the coil 13. Moreover, there is no grid bias provided in this connection so that the grid in a stationary position lies directly on the cathode potential. The result of this is that when alternating voltages occur, the coil 13 is energized by a grid current which charges the condenser 24. The condenser 24 discharges via the resistance 23, thus causing a voltage drop at this resistance displacing the working position in the area of negative grid biases.

According to the invention, the time constant of the RC connection comprised of the resistance 23 and the condenser 24 is so dimensioned that the tube oscillator does not produce continuous oscillations but intermittent oscillations. For this purpose, the time constant RC is so chosen that it amounts to about 20 to 100 times an oscillation period.

Figure 5:
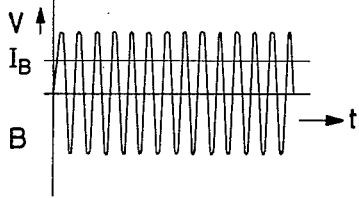
Figs. 5 and 6 show diagrams for explaining the mode of operation of the arrangement according to Fig. 2.
Figure 5:
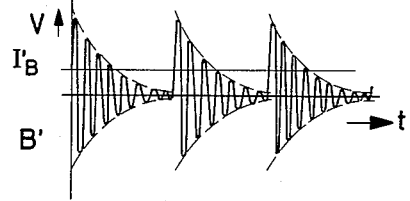
Figure 6:
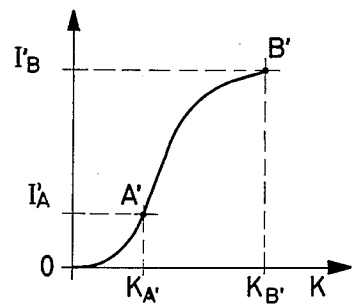

The mode of operation of the connection of Fig. 2 is best understood by way of the diagrams of Figs. 5 and 6, which correspond to the diagrams in Fig. 3 or 4 respectively. Fig. 5A' shows the time path of the anode alternating voltage V which is produced by a certain coupling $K_{A'}$ at the output of the tube oscillator. As evident, the alternating voltage no longer extends continuously, but its amplitude rapidly decreases, whereupon the oscillation in dependence upon the dimensioning of the RC constant practically breaks temporarily or has a very small amplitude. This is caused in that when the oscillations set in, the condenser 24 is charged, whereby the grid bias of the tube 10 is shifted into the negative range. Whereupon the amplitude of the oscillations is rapidly reduced and the condenser 24 discharged by way of the resistance 23. When the condenser 24 has been discharged, the oscillation sets in again and the same procedure is repeated. This leads to the occurrence of intermittent oscillations. To the course of the voltage V corresponds a definite direct current $I'_A$, which is also shown in the diagram of Fig. 5A'. The diagram of Fig. 5B' shows the time-path of the voltage V for a different coupling $K_{B'}$. This voltage also extends intermittently and corresponding thereto is a direct current $I'_B$ in the consumer 22, which current is greater than the direct current $I'_A$.

In the diagram of Fig. 6 there is shown the dependence of the direct current I through the consumer 22 in dependence upon the coupling K for the connection of Fig. 2. The working points A' and B', which correspond to the operational states of Fig. 5A' or Fig. 5B' respectively, are inserted in the diagram. As evident, there is no minimum factor of the coupling in this connection, at which the graph for the current I suddenly breaks; but it is possible by reducing the coupling K, to reduce the coefficient of the current I constantly until zero has been reached. Therefore, it is possible to operate with this arrangement at a much greater indicating range than with the arrangement according to Fig. 1.

I claim:

An arrangement for the inductive scanning of a pointer with a vacuum tube oscillator having a cathode, anode and at least one control grid, said oscillator having a non-linearly extending amplifier characteristic line comprising first and second inductively coupled coils, said first coil being connected in circuit with said grid, anode, and cathode of said oscillator and said second coil connected in circuit with said anode and cathode of said oscillator whereby an output voltage of said oscillator of constant frequency is fed back to said control grid of said oscillator to which said first coil is connected, the amplitude of said oscillator output voltage corresponding to the inductive coupling between said first and second coils; a metal tongue attached to said pointer the position of which is to be scanned, and arranged so that actuation of said pointer moves said metal tongue to a greater or lesser extent into a common air gap formed between said first and second coils thereby varying the coupling between said first and second coils and the amplitude of said oscillator output voltage, the amplitude of which corresponds to the positioning of said pointer; a resistance-condenser combination in said grid circuit of said oscillator, the time constant of which is so selected as to cause intermittent oscillations of said oscillator; a third coil inductively coupled with one of said first and second coils; and an electrical indicating instrument responsive to a voltage induced in said third coil by the oscillator output voltage in energizing said second coil for continuously indicating the amplitude of said oscillator output voltage throughout a range extending between zero and a preselected value whereby said indicating instrument indicates the position of said metal tongue attached to said pointer with respect to said first and second coils in passing therebetween.

References Cited in the file of this patent

UNITED STATES PATENTS

| | | |
|---|---|---|
| 1,621,034 | Slepian | Mar. 15, 1927 |
| 2,154,287 | Schewe | Apr. 11, 1939 |
| 2,325,927 | Wilbur | Aug. 3, 1943 |
| 2,505,577 | Rich | Apr. 25, 1950 |
| 2,519,807 | Yeater | Aug. 22, 1950 |
| 2,584,728 | Michel | Feb. 5, 1952 |
| 2,647,252 | Moore | July 28, 1953 |